No. 676,122. Patented June 11, 1901.
C. BYRNES.
ORNAMENTAL GLASS AND METHOD OF MAKING SAME.
(Application filed Nov. 19, 1898.)
(No Model.)
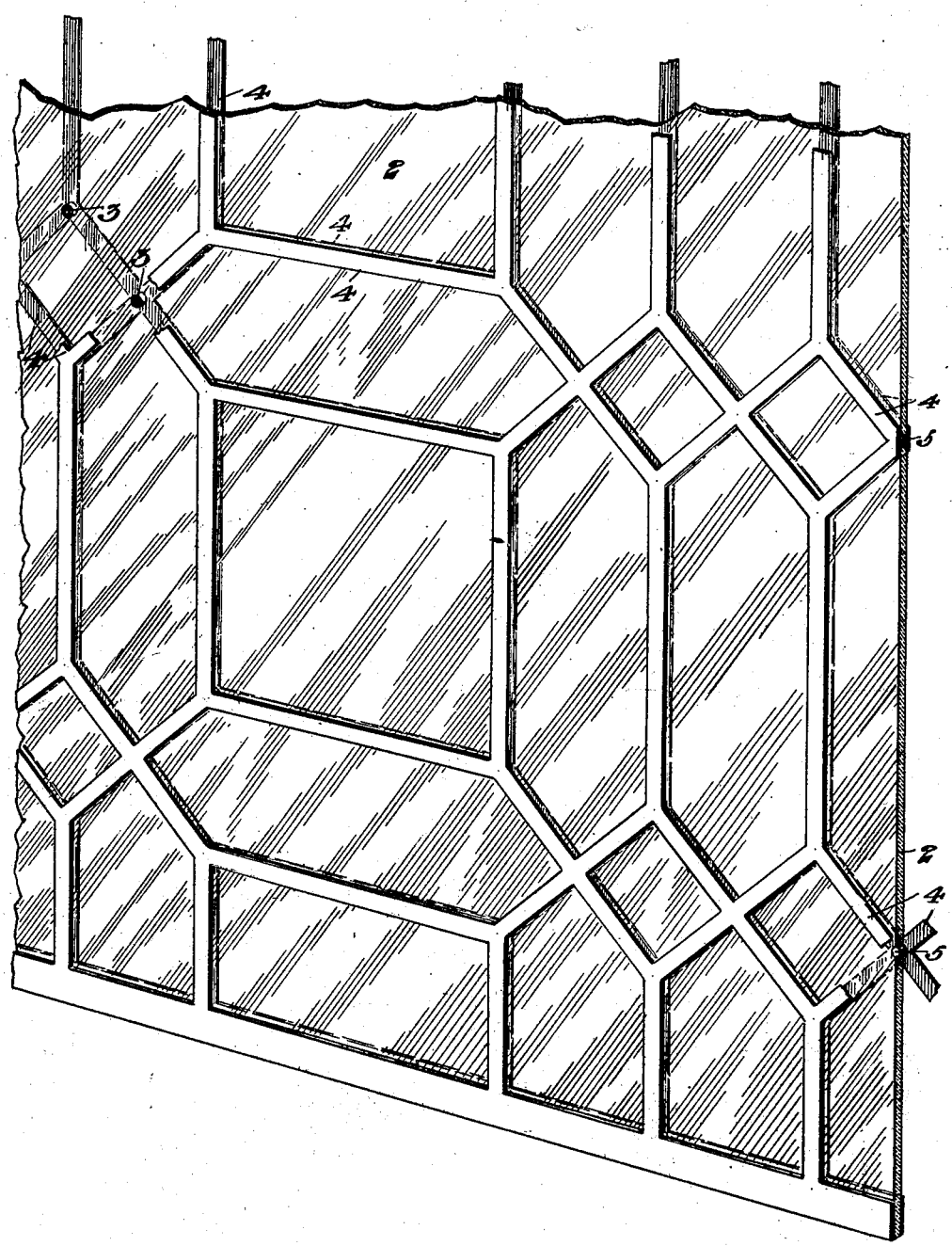
WITNESSES
INVENTOR

UNITED STATES PATENT OFFICE.

CLARENCE BYRNES, OF SEWICKLEY, PENNSYLVANIA.

ORNAMENTAL GLASS AND METHOD OF MAKING SAME.

SPECIFICATION forming part of Letters Patent No. 676,122, dated June 11, 1901.

Application filed November 19, 1898. Serial No. 696,847. (No model.)

*To all whom it may concern:*

Be it known that I, CLARENCE BYRNES, of Sewickley, in the county of Allegheny and State of Pennsylvania, have invented a new and useful Improvement in Ornamental Glass and Methods of Making the Same, of which the following is a full, clear, and exact description, reference being had to the accompanying drawing, forming part of this specification, in which the figure is a perspective view of a sheet of glass partly broken away and ornamented in accordance with my invention.

My invention relates to the ornamenting of articles of glass or other vitreous or ceramic material, and particularly to sheets or plates of such material having metal patterns on both sides thereof.

Heretofore in the manufacture of leaded glass the glass was cut into pieces of the proper shape and size, whose edges were fitted into grooved metal strips, these strips then being soldered at their junctures to give the desired pattern.

My invention does away with the cutting of the glass into pieces and greatly reduces the labor, time, and expense incident to the manufacture of such ornamental glass. It gives a much stronger article and enables patterns to be used which are entirely separate and disconnected from each other, thus giving ornamental effects not heretofore possible in this class of glass.

In the drawing, 2 represents a glass sheet which is provided at different points, according to the desired pattern, with holes 3. These holes are preferably arranged so as to come beneath the junctures of the patterns where the patterns are connected, though they may be placed beneath the intermediate parts of the pattern-strips if desired.

4 4 are duplicate patterns, which are secured to the opposite faces of the glass sheet in registry with each other by means of metal plugs 5, which are inserted in the holes and secured to the patterns. I preferably join the plugs and patterns by self-soldering if lead is employed as the material of the plugs and patterns, though the plugs may be riveted or otherwise secured to the patterns. A glass sheet is thus afforded which gives the appearance of ordinary leaded glass, while it is much stronger, by reason of being in one integral piece of glass, and may be cheaply and quickly made.

In carrying out my invention with glass of this character I perforate a sheet or plate of glass in any desirable way—such as by punching the holes therein while the glass is sufficiently hot to prevent its cracking, by drilling, or by sending disruptive charges of electricity through the plate at the proper points; or where the glass plate is formed by rolling the holes may be formed by suitable projections upon the roller or the table over which the roller passes. Other means may be devised by those skilled in the art for forming these holes. In this application of the invention the metal patterns are made in duplicate, and where the parts of the patterns are connected throughout may be cast, stamped, or cut into form in one integral piece if desired, or the patterns may be made of separated strips or pieces of metal. In joining the patterns to the glass the glass sheet may be laid upon one of the patterns and properly positioned thereon. Metal plugs are then inserted in the holes and the other pattern laid upon the glass and brought into registry with the first pattern. A hot iron is then applied to those parts of the patterns over the plugs, so as to self-solder the patterns and plugs together, thus firmly securing the patterns to the opposite faces of the glass. The plugs may, if desired, be formed integrally with one of the patterns or with parts thereof.

The advantages of my invention will be apparent to those skilled in the art, since an article is provided which gives the appearance of being built up of separated pieces, while strong structure is obtained and the cost greatly reduced. It is evident that by the use of this invention separated patterns, such as concentric rings or other separated figures, may be applied to the glass, thus giving a new ornamental effect.

The article may be provided with a pattern upon only one side in certain cases, and the plugs need not extend entirely through the holes in the article. Plain or colored glass, or both, may be used, and ornamental glass of this character may be cut out in portions and other pieces of glass inserted, or pieces of glass made in accordance with this invention may be secured to other portions of glass. The article may be formed of any vitreous or ceramic material, different metals or compositions may be used for the patterns or designs, and many other variations may be made without departing from my invention.

I claim—

1. The method of securing a pattern to an article of vitreous or ceramic material, consisting in forming the article with holes extending through it, and securing the pattern thereto by plugs held in said holes; substantially as described.

2. The method of securing patterns on vitreous or ceramic material, consisting in forming the article with holes therethrough, and securing patterns to both sides of the article by plugs extending through said holes; substantially as described.

3. The method of ornamenting glass, consisting in drilling holes through the glass, inserting plugs within the holes and securing patterns to the plugs on both sides of the glass; substantially as described.

4. The method of securing a pattern to an article of vitreous or ceramic material, consisting in drilling holes through the article and securing the pattern thereto by plugs held in said holes; substantially as described.

5. The method of ornamenting glass sheets or plates consisting in drilling holes through the sheet, inserting plugs within the holes, and securing duplicate patterns to the plugs on both sides of the said sheet; substantially as described.

6. As a new article of manufacture, an article of vitreous or ceramic material having openings extending through it, and a separate pattern or design on the face of the article having shanks extending into and secured in said openings; substantially as described.

7. As a new article of manufacture, glass having a pattern secured thereto by a plug fastened in a hole extending through the glass; substantially as described.

8. As a new article of manufacture, an article of vitreous or ceramic material having patterns secured to its opposite faces by plugs extending through holes in the article, substantially as described.

9. As a new article of manufacture, a glass sheet or plate having duplicate patterns secured to its opposite faces by plugs extending through holes in the sheet or plate; substantially as described.

In testimony whereof I have hereunto set my hand.

CLARENCE BYRNES.

Witnesses:
G. I. HOLDSHIP,
G. B. BLEMMING.